United States Patent
Kaminski et al.

(10) Patent No.: US 7,850,191 B1
(45) Date of Patent: Dec. 14, 2010

(54) TRAILER WIRING CONNECTION

(75) Inventors: Gary Kaminski, Emporia, KS (US); David Ihde, Osage City, KS (US)

(73) Assignee: Hopkins Manufacturing Corp., Emporia, KS (US)

( * ) Notice: Subject to any disclaimer, the term of this patent is extended or adjusted under 35 U.S.C. 154(b) by 0 days.

(21) Appl. No.: 12/486,390

(22) Filed: Jun. 17, 2009

Related U.S. Application Data

(60) Provisional application No. 61/074,380, filed on Jun. 20, 2008.

(51) Int. Cl.
*B60D 1/62* (2006.01)

(52) U.S. Cl. ........................ 280/422; 280/420; 280/477; 439/35

(58) Field of Classification Search ................. 280/420, 280/422, 477; 439/34, 35
See application file for complete search history.

(56) References Cited

U.S. PATENT DOCUMENTS

| | | | | |
|---|---|---|---|---|
| 4,976,541 A * | 12/1990 | Scuitto et al. | ................ | 356/300 |
| 5,445,567 A * | 8/1995 | Chattin | ......................... | 474/78 |
| 5,580,076 A | 12/1996 | DeRoule et al. | | |
| 6,095,546 A * | 8/2000 | Austin | ......................... | 280/507 |
| 6,879,251 B2 * | 4/2005 | Robbins et al. | ............. | 340/471 |
| 6,942,234 B1 * | 9/2005 | Chait | ......................... | 280/244 |
| 6,951,346 B2 * | 10/2005 | Brackett et al. | .......... | 280/491.2 |
| 7,118,379 B1 * | 10/2006 | Wang | .......................... | 439/35 |
| 7,128,331 B2 | 10/2006 | Brackett et al. | | |
| 7,300,065 B2 * | 11/2007 | Tal | ............................... | 280/221 |
| 7,404,591 B2 * | 7/2008 | Bender | ......................... | 296/164 |
| 7,455,524 B1 | 11/2008 | Fudala et al. | | |
| D602,433 S * | 10/2009 | Katou et al. | ................ | D13/120 |
| 7,621,547 B1 * | 11/2009 | Fan | .............................. | 280/221 |
| 7,717,448 B2 * | 5/2010 | Clemons et al. | .............. | 280/258 |
| 2001/0050471 A1 * | 12/2001 | McCoy et al. | ................ | 280/504 |
| 2007/0114749 A1 * | 5/2007 | Tal | ............................... | 280/221 |
| 2009/0311881 A1 * | 12/2009 | Dilgard | ........................ | 439/35 |

\* cited by examiner

*Primary Examiner*—Paul N Dickson
*Assistant Examiner*—Tashiana Adams
(74) *Attorney, Agent, or Firm*—Hovey Williams LLP

(57) ABSTRACT

A trailer hitch apparatus for mechanically and electrically coupling a towing vehicle to a towed vehicle includes: a receiver and a trailer mount. The receiver has a receiver tube with an open end; a first electrical connector having a plurality of electrical contacts for attaching to the towing vehicle electrical system; and a second electrical connector having a plurality of electrical contacts electrically connected to the plurality of electrical contacts of the first electrical connector. The trailer mount is installed within the open end of the receiver tube and includes a mounting tube comprising a first end and a second end for inserting into the receiver tube; a third electrical connector having a plurality of electrical contacts and operable to mate with the second electrical connector; an attachment mount connected to the second end of the mounting tube; a trailer attachment device connected to the attachment mount for attaching a towed vehicle; and an electrical receptacle electrically having a plurality of electrical contacts and connected with the third electrical connector for providing an electrical signal to an electrical system of the towed vehicle.

12 Claims, 18 Drawing Sheets

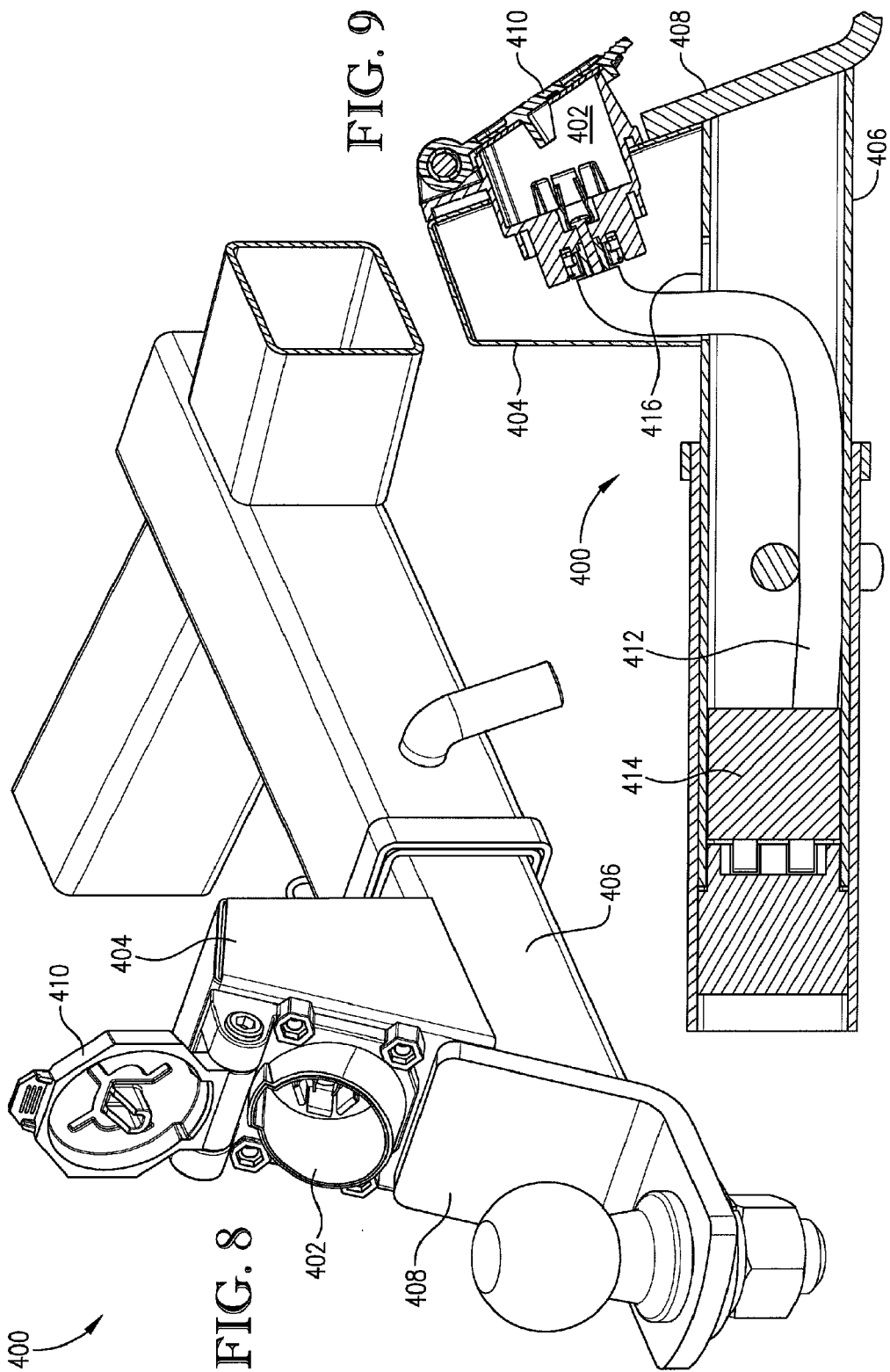

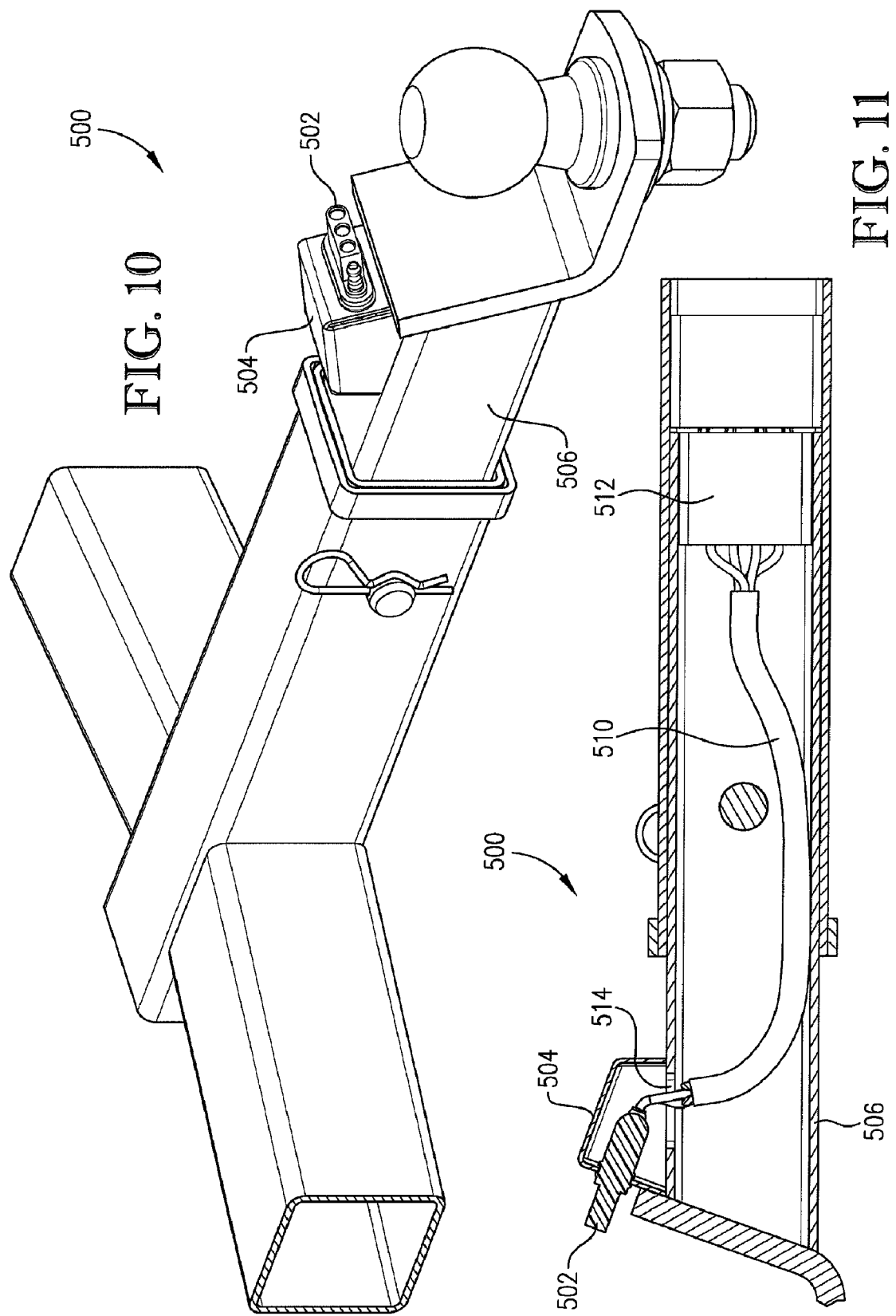

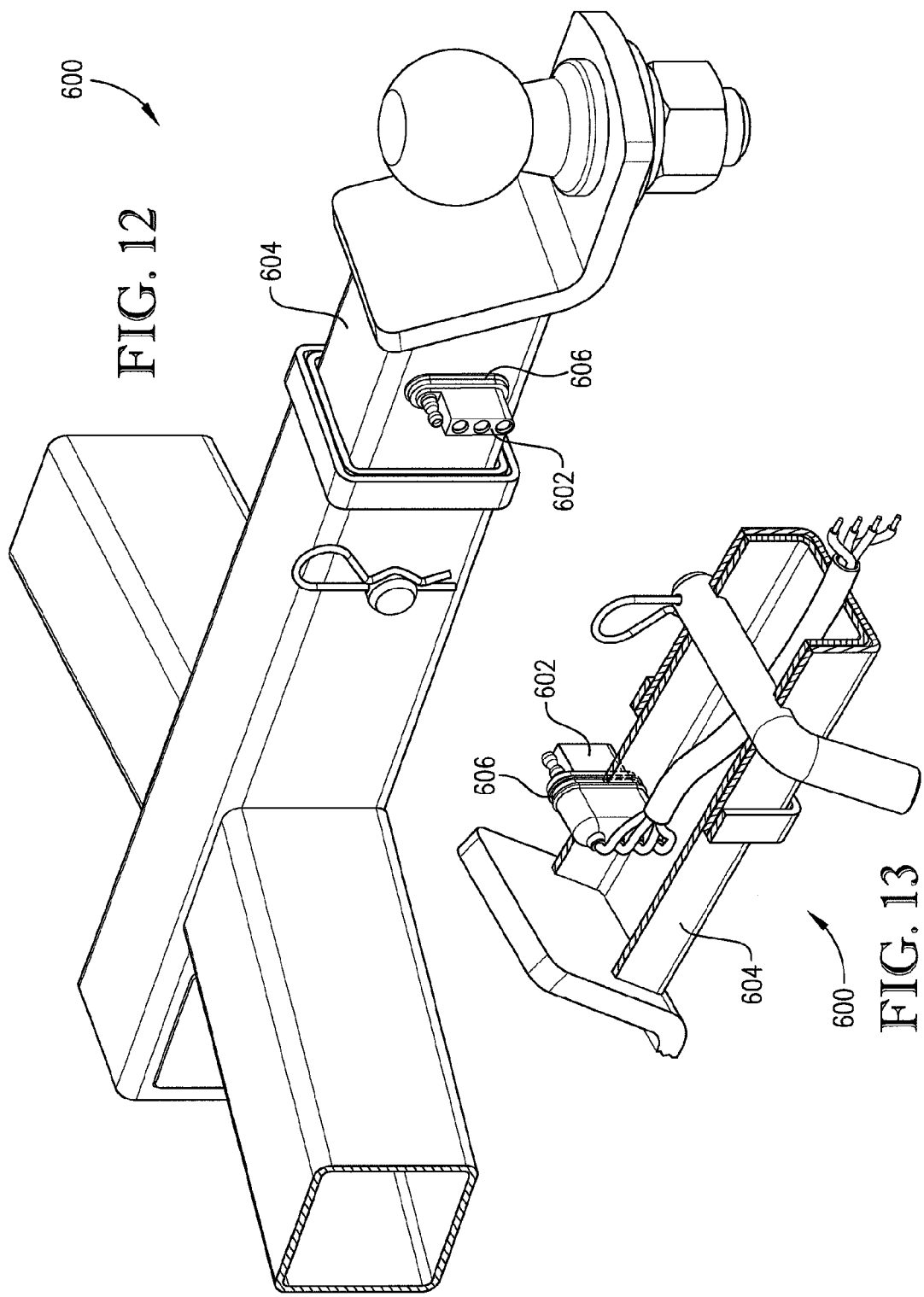

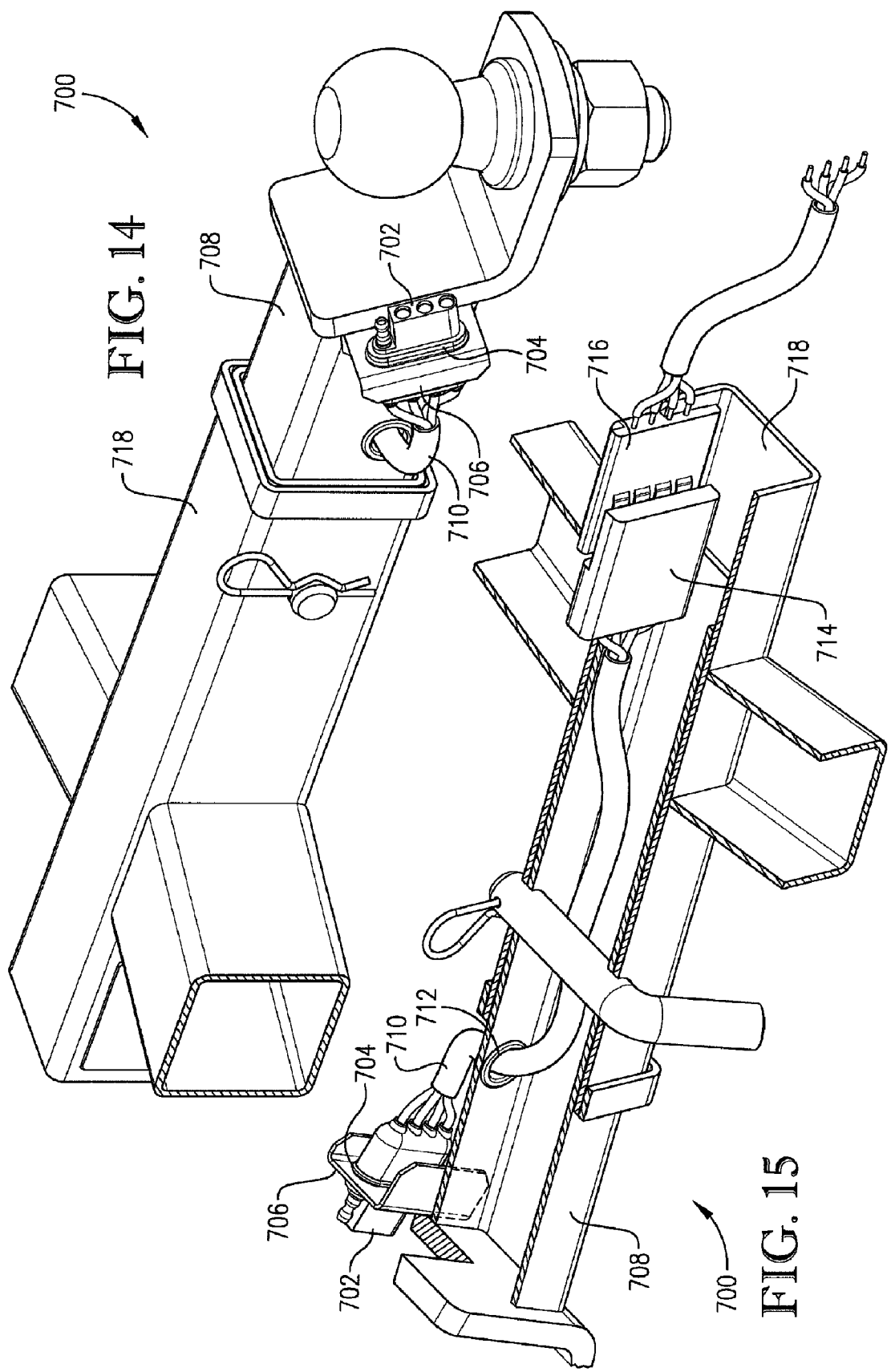

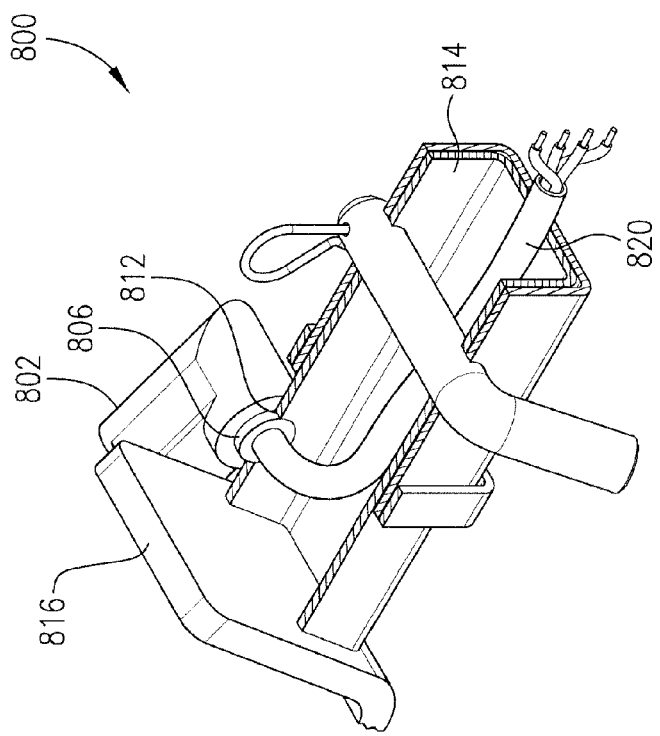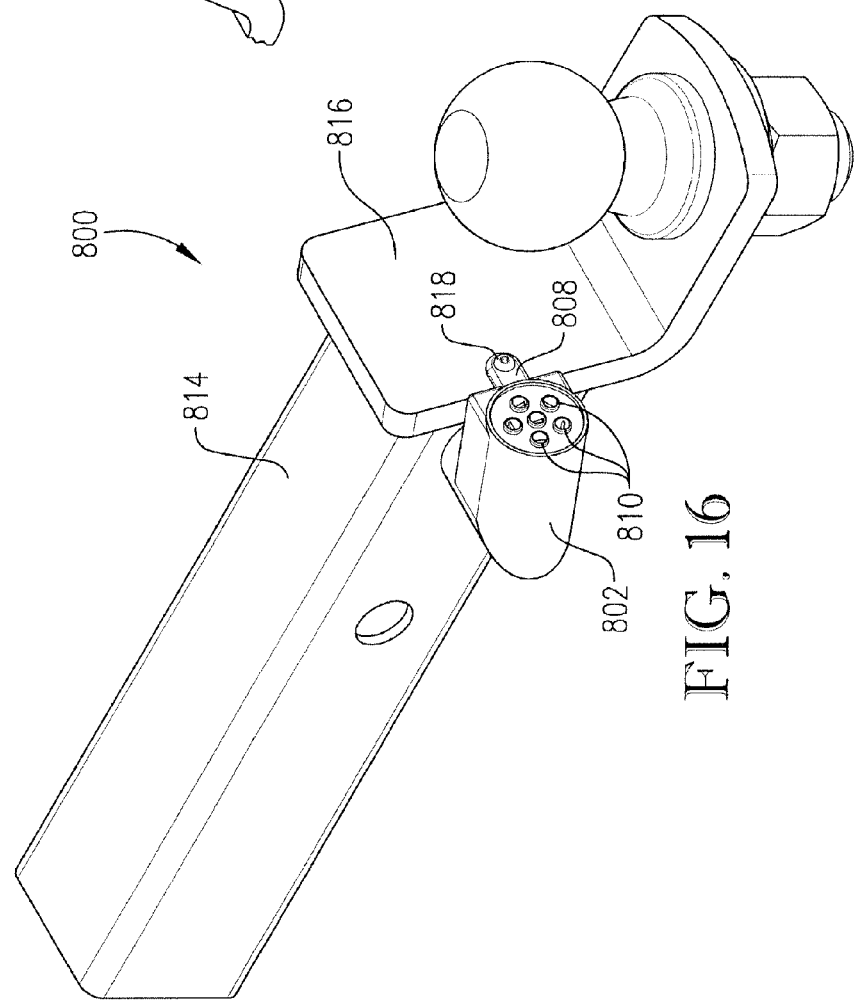

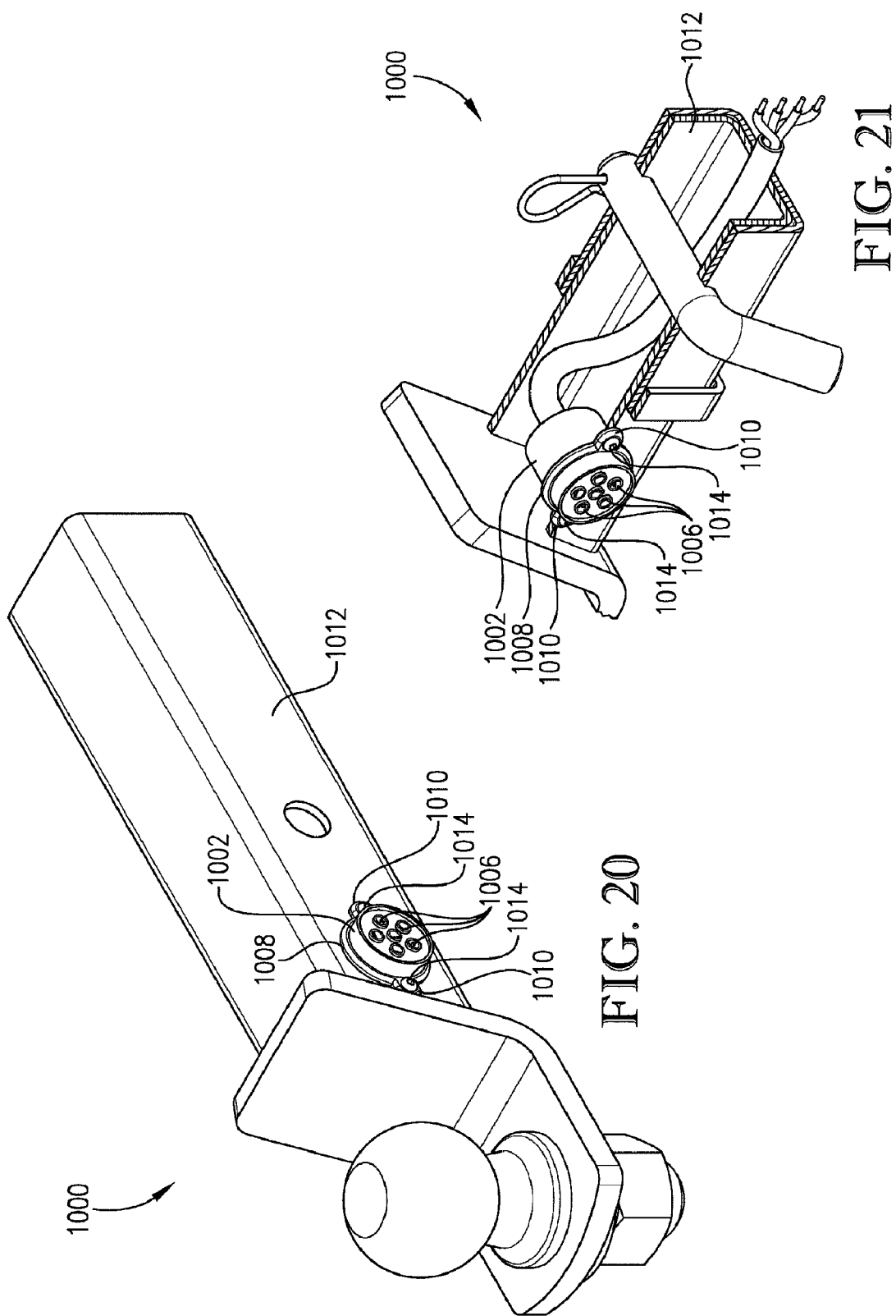

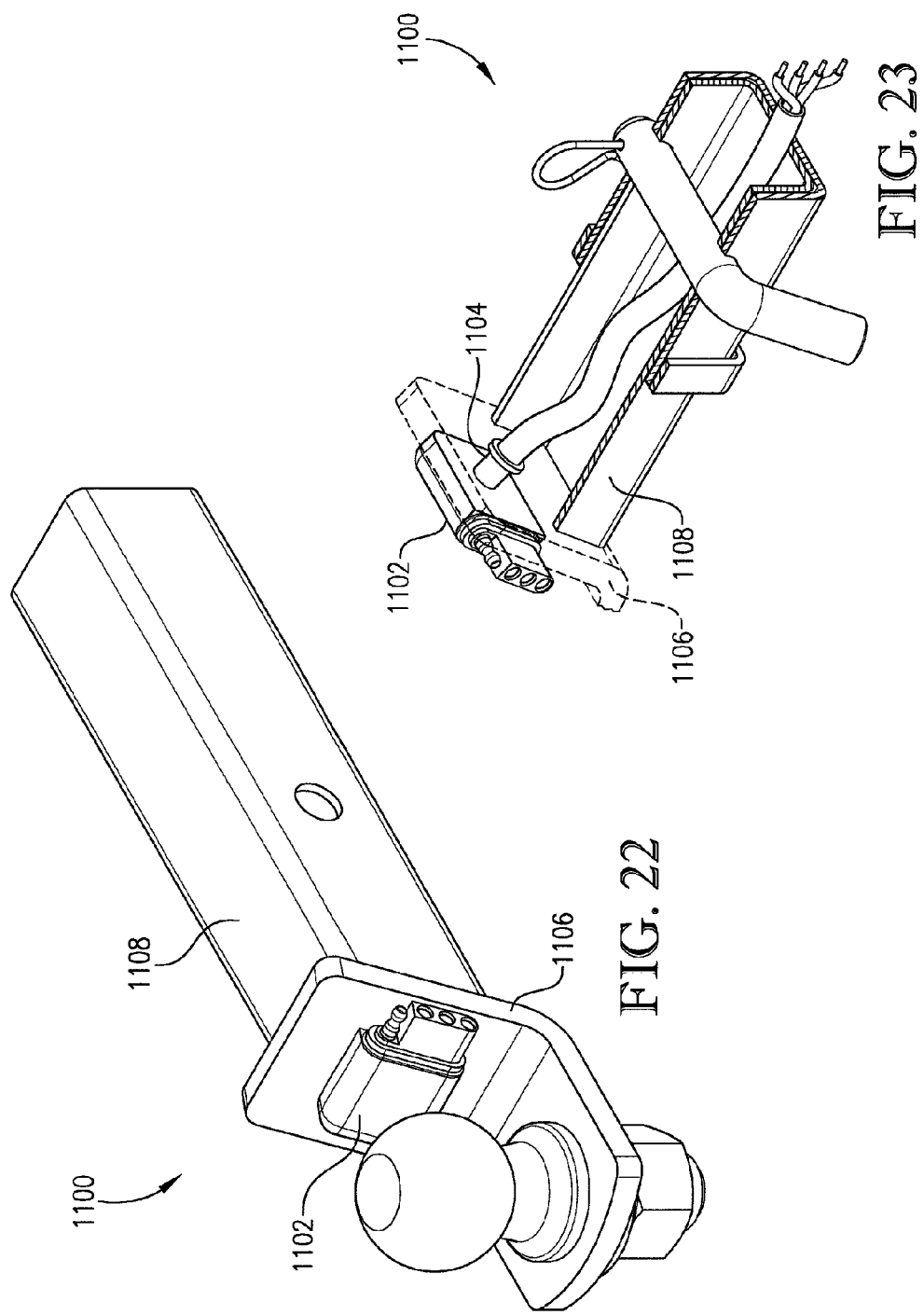

TRAILER WIRING CONNECTION

RELATED APPLICATION

The present application is a nonprovisional patent application and claims priority benefit, with regard to all common subject matter, of earlier-filed U.S. provisional patent application titled, "TRAILER WIRING CONNECTION", Ser. No. 61/074,380, filed Jun. 20, 2008, incorporated by reference in its entirety into the present document.

BACKGROUND

The present invention relates to trailer hitches. More particularly, the invention relates to trailer hitches with integrated wiring connections.

Various electrical and mechanical connections have been used to connect towed vehicles, such as trailers, to towing vehicles, such as trucks. The most common mechanical connection is a ball mount mounted on the towing vehicle with a corresponding ball mount socket portion on the towed vehicle. The most common electrical connectors include a 7 blade, six pin, and four flat.

Two methods are commonly used to mount a ball mount to a towing vehicle. In the first, a ball is directly mounted to a metal bumper of the towing vehicle. In the second, a metal frame is mounted to the frame of the towing vehicle. Typically, the frame has a square tube, a "receiver", permanently attached to the center of the frame so that the square tube is aligned with the direction of travel of the towing vehicle. Receivers commonly have interior dimensions of 5.08 cm (2 inches) or 3.175 cm (1.25 inches). A square metal tube with a ball mount attached thereto is inserted into the receiver in a telescoping orientation and secured with a pin. A ball socket of a towed vehicle is placed over the ball and secured in place to establish a secure mechanical connection between the towing vehicle and the towed vehicle. The square metal tube with the ball mount is removable when not in use to prevent premature corrosion of the ball mount.

The electrical system of the towed vehicle may be electrically connected to the electrical system of the towing vehicle using one of a variety of electrical connectors. Most commonly used is a four flat connector that comprises a molded plastic body with four electrical connectors. The towing vehicle has a connector attached to its electrical system by a length of wire and the towed vehicle also has a connector attached to its electrical system by a length of wire so that the two connectors may be attached. The extra length of wire for each connection allows flexibility in the connection and permits the towing vehicle to make turns without pulling the connectors apart. However, when driving straight, the wires hang low, possibly exposing them to damage, and may even drag on the ground, wearing their insulators and potentially causing a short circuit.

SUMMARY

The present invention solves the above-described problems and provides a distinct advance in the art of trailer hitches. More particularly, the present invention provides a trailer hitch including an integrated electrical receptacle that is oriented along the centerline of the towing vehicle, does not introduce excess wiring that can dangle, and allows the trailer mount to be removed from the receiver to prevent corrosion.

One embodiment of the present invention broadly includes a receiver and a trailer mount. The receiver broadly includes a receiver tube, a first and second electrical connector, and a frame. The receiver tube is oriented generally in the line of travel of the towing vehicle and may include a frame to allow fastening of the receiver tube to the towing vehicle. The first electrical connector is attached to the wiring system of the towing vehicle, such as by connecting individual wires, using one or more electrical connectors or, if the towing vehicle is so equipped, by attaching a mating connector to the towing vehicle wiring system. The second electrical connector is electrically connected with the first electrical connector, and in one embodiment, the second electrical connector is contained within one end of the receiver tube. In other embodiments, the second electrical connector may be located on the exterior of the receiver tube.

In one embodiment, the trailer mount broadly includes a mounting tube, a third electrical connector, an electrical receptacle, an attachment mount and a trailer attachment device. The mounting tube is slightly smaller than the receiver tube so that the mounting tube may be inserted telescopingly within the receiver tube. The attachment mount is mounted on one end of the mounting tube and has a portion for mounting a trailer attachment device. The trailer attachment device may be a ball mount, a multiple ball mount, a pintle hook, a tow ring, a tow strap mount, a clevis mount, or the like. The third electrical connector is positioned so that, when the mounting tube is fully inserted in the receiver tube, it matingly connects with the second electrical connector of the receiver and makes electrical contact. The electrical receptacle is electrically connected to the third electrical connector, is positioned for easy connection of the towed vehicle electrical system, and may be fixed to the mounting tube, the attachment mount, or the receiver tube. Alternatively, the electrical receptacle may be enclosed within a housing that is attached to the mounting tube, the attachment mount, or the receiver tube.

In use, the first electrical connector is attached to the towing vehicle electrical system and the trailer mount is inserted into the receiver and secured with a pin. In this configuration, the second electrical connector is electrically connected to the third electrical connector. The towed vehicle electrical system is attached to the electrical receptacle and thus the towing vehicle electrical system is connected to the towed vehicle electrical system.

This summary is provided to introduce a selection of concepts in a simplified form that are further described below in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein:

FIG. 8 is a perspective view of a trailer hitch apparatus constructed in accordance with an embodiment of the present invention;

FIG. 9 is a vertical sectional view along the midline of the major axis of a trailer hitch apparatus constructed in accordance with an embodiment of the present invention;

FIG. 10 is a perspective view of a trailer hitch apparatus constructed in accordance with an embodiment of the present invention;

FIG. 11 is a vertical sectional view along the midline of the major axis of a trailer hitch apparatus constructed in accordance with an embodiment of the present invention;

FIG. 12 is a perspective view of a trailer hitch apparatus constructed in accordance with an embodiment of the present invention;

FIG. 13 is a perspective view with cutaways to show internal components of a trailer hitch apparatus constructed in accordance with an embodiment of the present invention;

FIG. 14 is a perspective view of a trailer hitch apparatus constructed in accordance with an embodiment of the present invention;

FIG. 15 is a perspective view with cutaways to show internal components of a trailer hitch apparatus constructed in accordance with an embodiment of the present invention;

FIG. 16 is a perspective view of a trailer hitch apparatus constructed in accordance with an embodiment of the present invention;

FIG. 17 is a perspective view with cutaways to show internal components of a trailer hitch apparatus constructed in accordance with an embodiment of the present invention;

FIG. 20 is a perspective view of a trailer hitch apparatus constructed in accordance with an embodiment of the present invention;

FIG. 21 is a perspective view with cutaways to show internal components of a trailer hitch apparatus constructed in accordance with an embodiment of the present invention;

FIG. 22 is a perspective view of a trailer hitch apparatus constructed in accordance with an embodiment of the present invention;

FIG. 23 is a perspective view with cutaways to show internal components of a trailer hitch apparatus constructed in accordance with an embodiment of the present invention;

Figure 1:
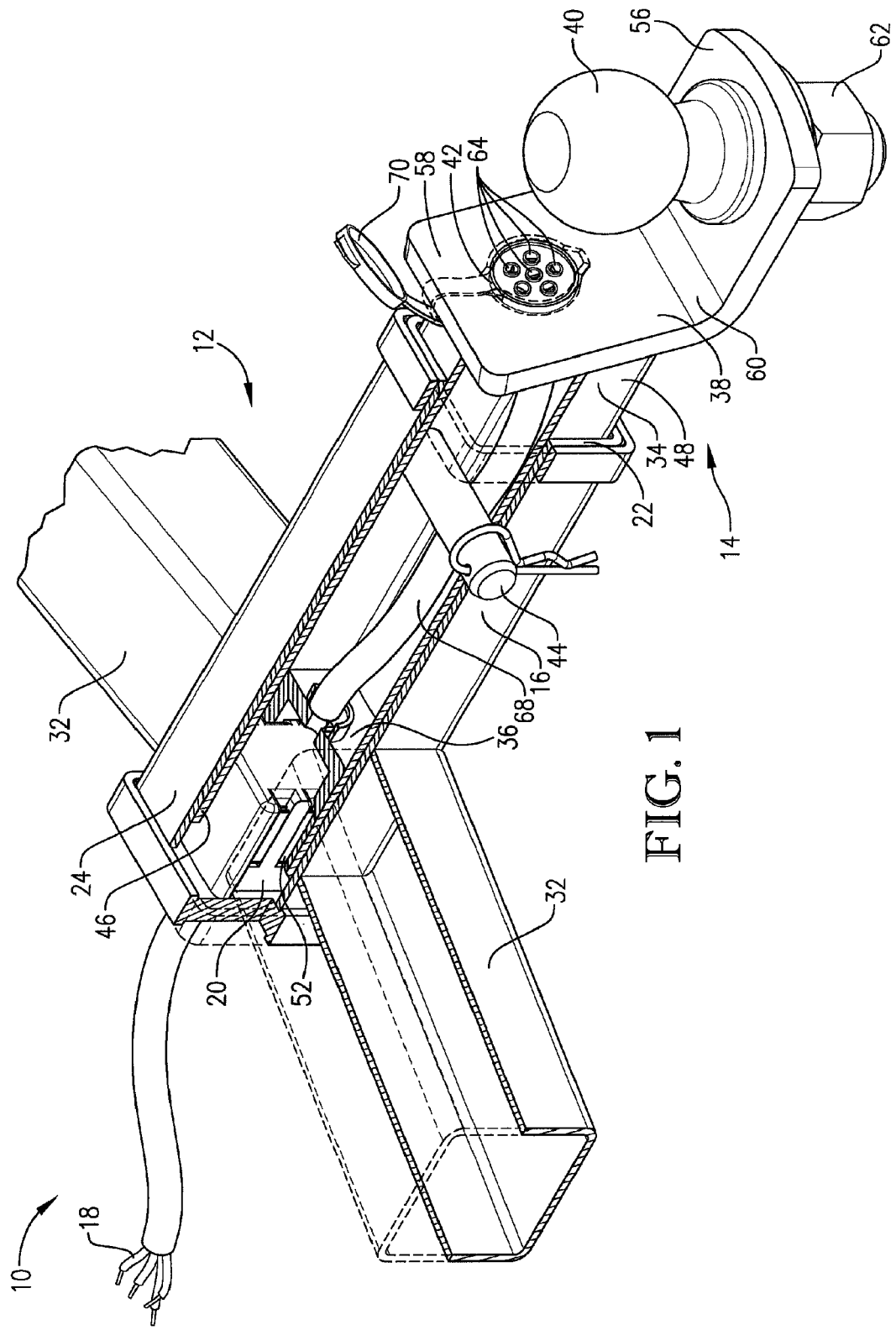
FIG. 1 is a perspective view with cutaways to show internal components of a trailer hitch apparatus constructed in accordance with an embodiment of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Turning now to the drawing figures, and particularly FIGS. 1-4, a trailer hitch apparatus 10 constructed in accordance with an embodiment of the invention is illustrated. The trailer hitch apparatus 10 may be used to mechanically and electrically connect a towed vehicle, such as a trailer, to a towing vehicle, such as a truck, and broadly includes a receiver 12 and a trailer mount 14.

The receiver 12 broadly includes a receiver tube 16, a first electrical connector 18, and a second electrical connector 20.

The receiver tube 16 is secured to the towing vehicle to provide a mating location for the trailer mount 14. The receiver tube 16 may have a square, round or other shape. The embodiment of the receiver tube 16 shown in FIG. 1, has a generally square cross-section. The receiver tube's interior width and height may be 5.08 cm (2 inches) or 3.175 cm (1.25 inches), but may deviate from these dimensions without departing from the scope of the invention. The receiver tube 16 is constructed with a 6.35 mm (0.25 inches) wall thickness, but may be any thickness, without deviating from the scope of the invention. The receiver tube 16 has a first open end 22 and a second end 24. The receiver tube 16 is constructed from steel or aluminum, but may be any other material capable of handing the loads placed upon it. The receiver tube 16 is generally secured to the towing vehicle so that length of the receiver tube 16 is along the primary direction of travel of the towing vehicle. The receiver tube 16 may include a horizontally aligned pin hole 26 transverse with the primary axis of the receiver tube 16.

The first electrical connector 18 comprises a plurality of electrical conductors that may be connected with an electrical system of the towing vehicle. The first electrical connector 18 may be a plurality of wires or a commercially available connector such as a four wire flat, a five wire flat, a four pole round, a five pole round, a six pole round, a seven pole RV blade and a six pole square. In the embodiment shown in FIG. 1, the first electrical connector 18 is a plurality of wires capable of being soldered or otherwise connected into the towing vehicle electrical system. The first electrical connector 18 may utilize any means of establishing an electrical connection with the electrical system of the towing vehicle without deviating from the scope of the invention.

The second electrical connector 20 comprises a plurality of contacts 28 electrically connected to the first electrical connector 18. The second electrical connector 20 may be any connector including a commercially available connector such as four wire flat, a five wire flat, a four pole round, a five pole round, a six pole round, a seven pole RV blade and a six pole square. The second electrical connector 20 may be secured in a variety of locations such as inside the first open end 22 of receiver tube 16 or on the top, bottom or side of the exterior of the receiver tube 16.

The receiver 12 may also include a frame 32 to facilitate installation on a towing vehicle. The frame 32 may include square tubes, round tubes, flanges or any other piece operable to aid attachment to the towing vehicle. The frame 32 is generally wider than the receiver tube 16. The frame 32 may be constructed of steel, aluminum or any other material capable of handing the load applied.

The trailer mount 14 broadly includes a mounting tube 34, a third electrical connector 36, an attachment mount 38, a trailer attachment device 40, and an electrical receptacle 42.

Figure 2:
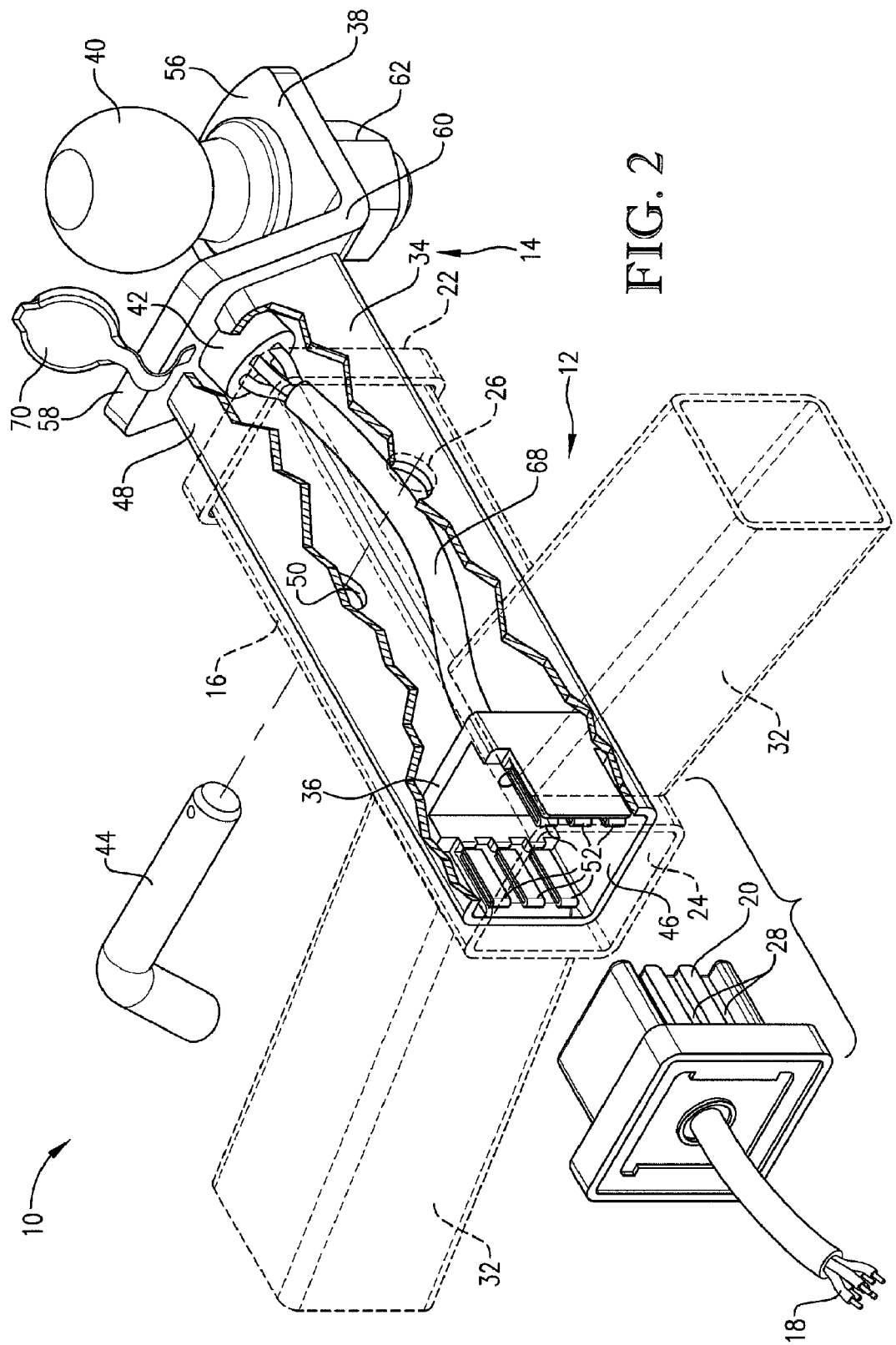
FIG. 2 is a perspective view of a trailer hitch apparatus with cutaways to show internal components and with the second electrical connector detached from the receiver tube.
Figure 3:
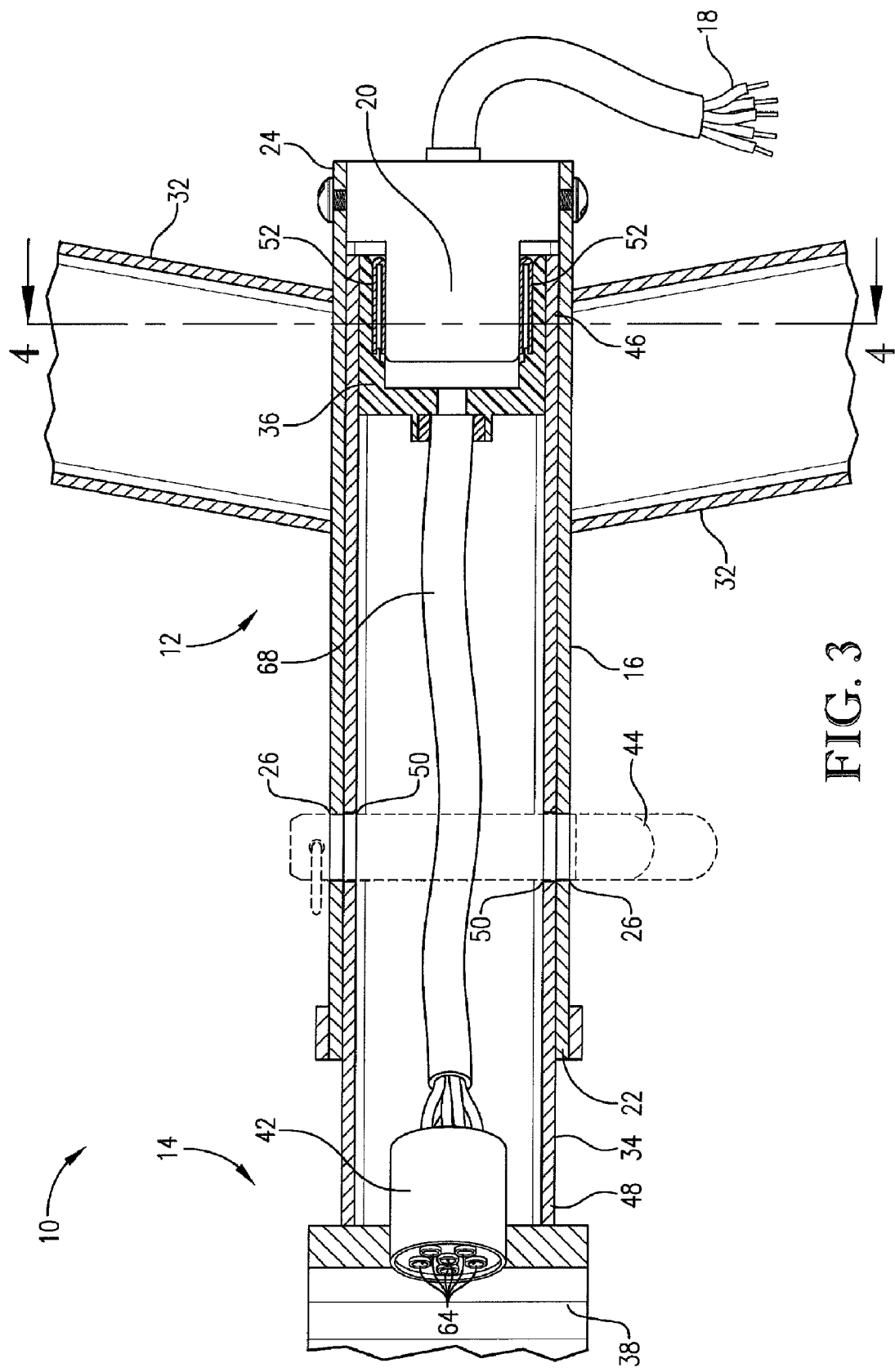
FIG. 3 is a horizontal sectional view of the trailer hitch apparatus constructed in accordance with an embodiment of the present invention.
Figure 4:
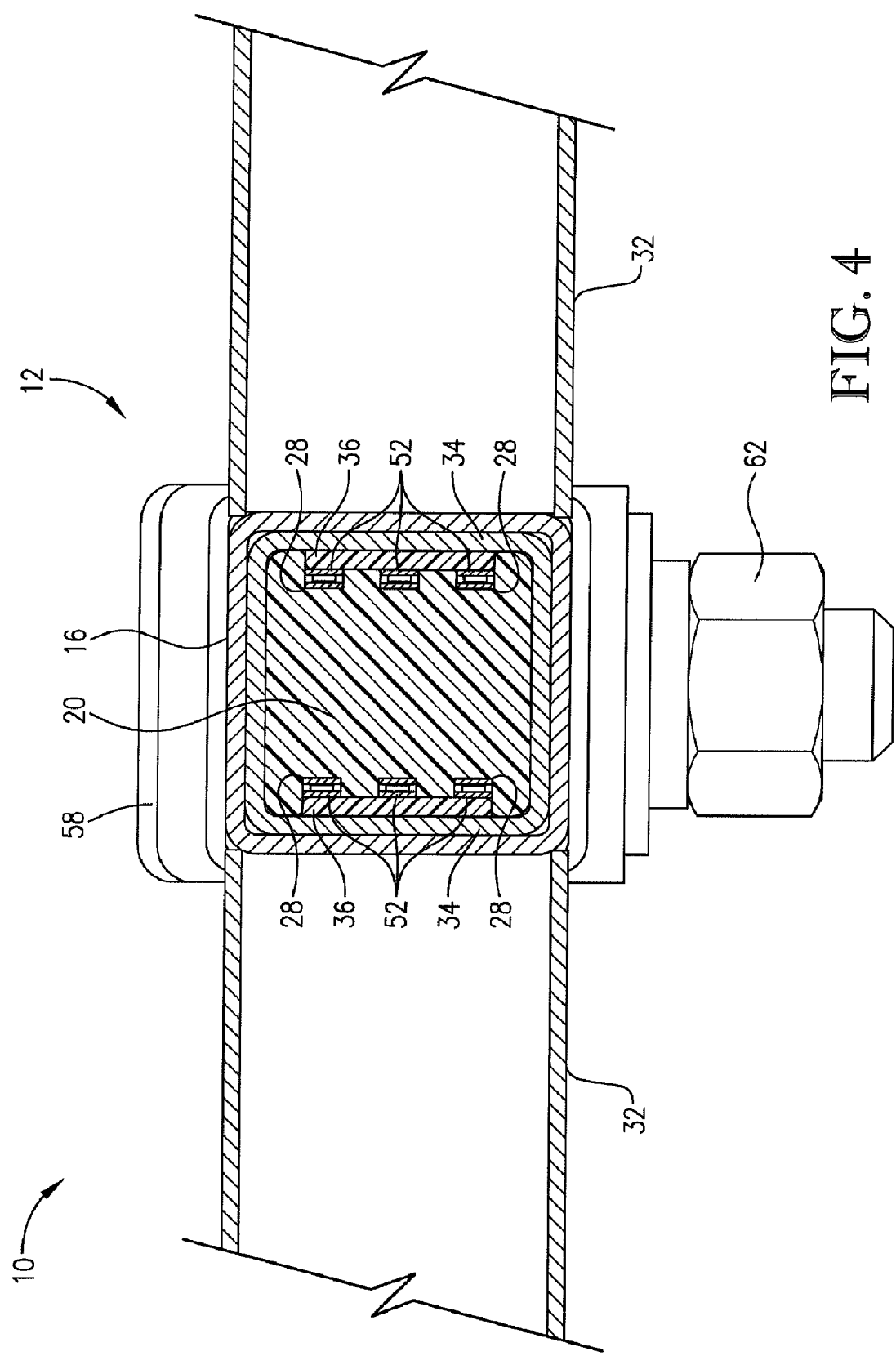
FIG. 4 is an vertical sectional view of the trailer hitch apparatus along cut line X of FIG. 3.

The mounting tube 34 fits within the receiver tube 16 in a telescoping arrangement and supports the attachment mount 38 and the electrical receptacle 42. The mounting tube 34 may be a square tube, cylindrical tube or any other shape that matches the shape of the receiver tube 16 or otherwise securely fits within the receiver tube 16. The mounting tube 34 has an exterior width and height slightly smaller than the interior dimension of the receiver tube 16. In the embodiment of FIGS. 1 and 2, the mounting tube 34 is a square tube with 6.35 mm (0.25 inches) wall thickness, but may be any thickness, without deviating from the scope of the invention. The mounting tube 34 has a first end 46, a second end 48. The mounting tube 34 may be constructed of steel, aluminum or any material capable of carrying the weight of the trailer. The mounting tube 34 may have a horizontally aligned pin hole 50 that, when installed in the receiver tube 16, axially aligns with the pin hole 26 in the receiver tube 16 so pin 44 may be placed therein to secure the mounting tube 34 within the receiver tube 16.

The third electrical connector 36 comprises a plurality of contacts 52. The third electrical connector 36 may be a commonly available connector such as a four wire flat, a five wire flat, a four pole round, a five pole round, a six pole round, a seven pole RV blade or a six pole square, but may be any connector capable of mating with the second electrical connector 26 and providing an electrical connection between the plurality of contacts 28 of the second electrical connector 20 and the plurality of contacts 52 of the third electrical connector 36. The third electrical connector 36 is attached to a location so that when the mounting tube 34 is installed within the receiver tube 16 the third electrical connector 36 matingly connects with the second electrical connector 20.

The attachment mount 38 is fixedly attached to the second end 48 of the mounting tube 34 and supports the trailer attachment device 40. The attachment mount 38 comprises a generally horizontal portion 56 and a slanted portion 58 with an obtuse bend 60 at approximately half the length of the attachment mount 38. The attachment mount 38 may also use different bends without deviating from the scope of the invention. The attachment mount 38 may also provide a horizontal portion 56 that is lower or higher, depending on the height of the trailer and the height of the receiver tube 16 when mounted on the towing vehicle. The attachment mount 38 is 6.35 mm (0.25 inches) thick, slightly wider than the width of the mounting tube 34, and long enough to provide a secure attachment point for the trailer attachment device 40, but the length, width and thickness may vary without deviating from the scope of the invention. The attachment mount 38 may be constructed of steel, aluminum, or any material capable of supporting the load of the trailer. The slanted portion 58 is attached to the mounting tube 34 with welds, bolts, or any other method of attachment capable of supporting the load of the trailer. The attachment mount 38 may be formed integrally with the mounting tube 34 or it may be a separate element securely attached to the mounting tube 34. Instead of a horizontal portion 56, the attachment mount 38, may provide a portion oriented vertically or in some other orientation depending on the requirements of the trailer attachment device 40 and the trailer.

The trailer attachment device 40 provides an attachment point for the trailer. The trailer attachment device 40 may be a ball mount, a multiple ball mount, a pintle hook, a tow ring, a tow strap mount, a clevis mount, or any other device capable of securing a trailer including combinations of the foregoing. In the embodiment of FIGS. 1-4, a portion of the trailer attachment device 40 is a ball mount with a portion inserted through a hole in the horizontal portion 56 of attachment mount 38 and affixed thereto with a fastener 62 such as bolt or similar means.

The electrical receptacle 42 comprises a plurality of electrical contacts 64 and provides an attachment point for the electrical system of the towed vehicle. The electrical receptacle 42 may be a commonly available connector such as a four wire flat, a five wire flat, a four pole round, a five pole round, a six pole round, a seven pole RV blade or a six pole square. The electrical receptacle 42 may be mounted substantially inside the mounting tube 34 and extending through a hole through the mounting tube 34; it may be mounted behind a portion of the attachment mount 38 and placed through a hole in the attachment mount 38; it may be directly attached to the mounting tube 34, or receiver tuber 16; or it may be attached to a housing that is attached to the mounting tube 34, attachment mount 38, receiver tube 16 or the frame 32. The electrical receptacle 42 may be attached in a parallel, transverse, or angled orientation with respect to the length of the mounting tube 34. The electrical receptacle may also include a lid 70 operable to cover the electrical receptacle and protect it from the environmental elements, such as water.

The plurality of conductors 68 provides an electrical connection between the electrical receptacle 42 and the third electrical connector 36. The plurality of conductors may be wires, or any device capable of carrying an electrical signal. The plurality of conductors 68 may be mounted on the interior, exterior, or both, of the mounting tube 34.

As shown in FIG. 1, when assembled, the first electrical connector 18 is electrically connected with the second electrical connector 20, the third electrical connector 36 and the electrical receptacle 42. Therefore, when the first electrical connector 18 is connected to the towing vehicle electrical system and the trailer wiring system is attached to the electrical receptacle 42, the electrical receptacle 42 is operable to transmit electrical signals from the towing vehicle electrical system to the trailer electrical system.

Figure 5:
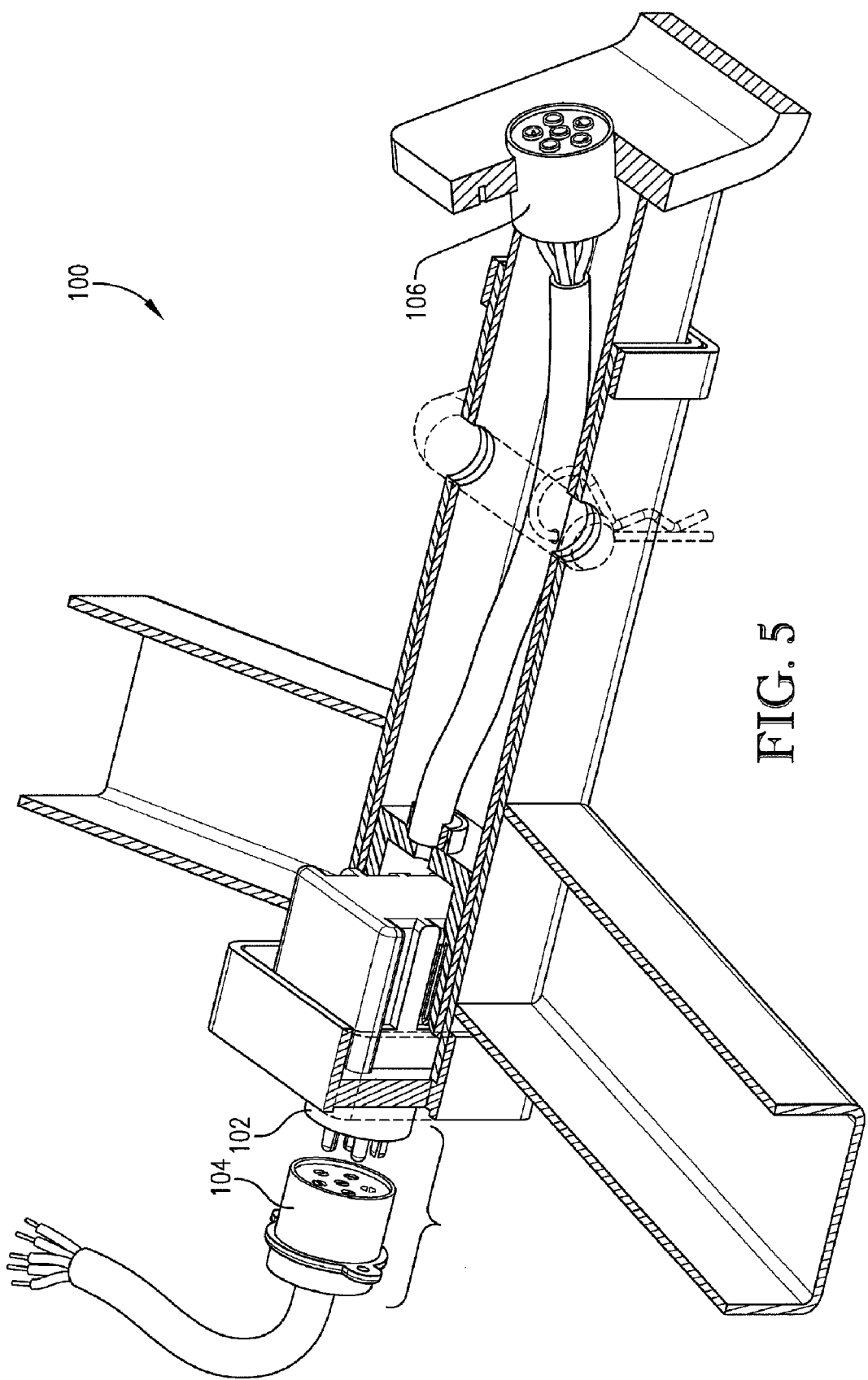
FIG. 5 is a perspective view with cutaways to show internal components of a trailer hitch apparatus constructed in accordance with an embodiment of the present invention.

Turning now to FIG. 5, a trailer hitch apparatus 100 constructed in accordance with another embodiment of the invention is shown. The trailer hitch apparatus 100 is substantially similar to the trailer hitch apparatus 10 of FIGS. 1-4 and therefore only the differences between the embodiments will be indicated. In this embodiment, the first electrical connector 102 is male six-pole round connector capable of mating with a female six-pole round connector towing vehicle electrical connector 104. The electrical receptacle 106 is also a female six-pole round connector. In this embodiment, there is no lid covering the electrical receptacle.

Figure 6:
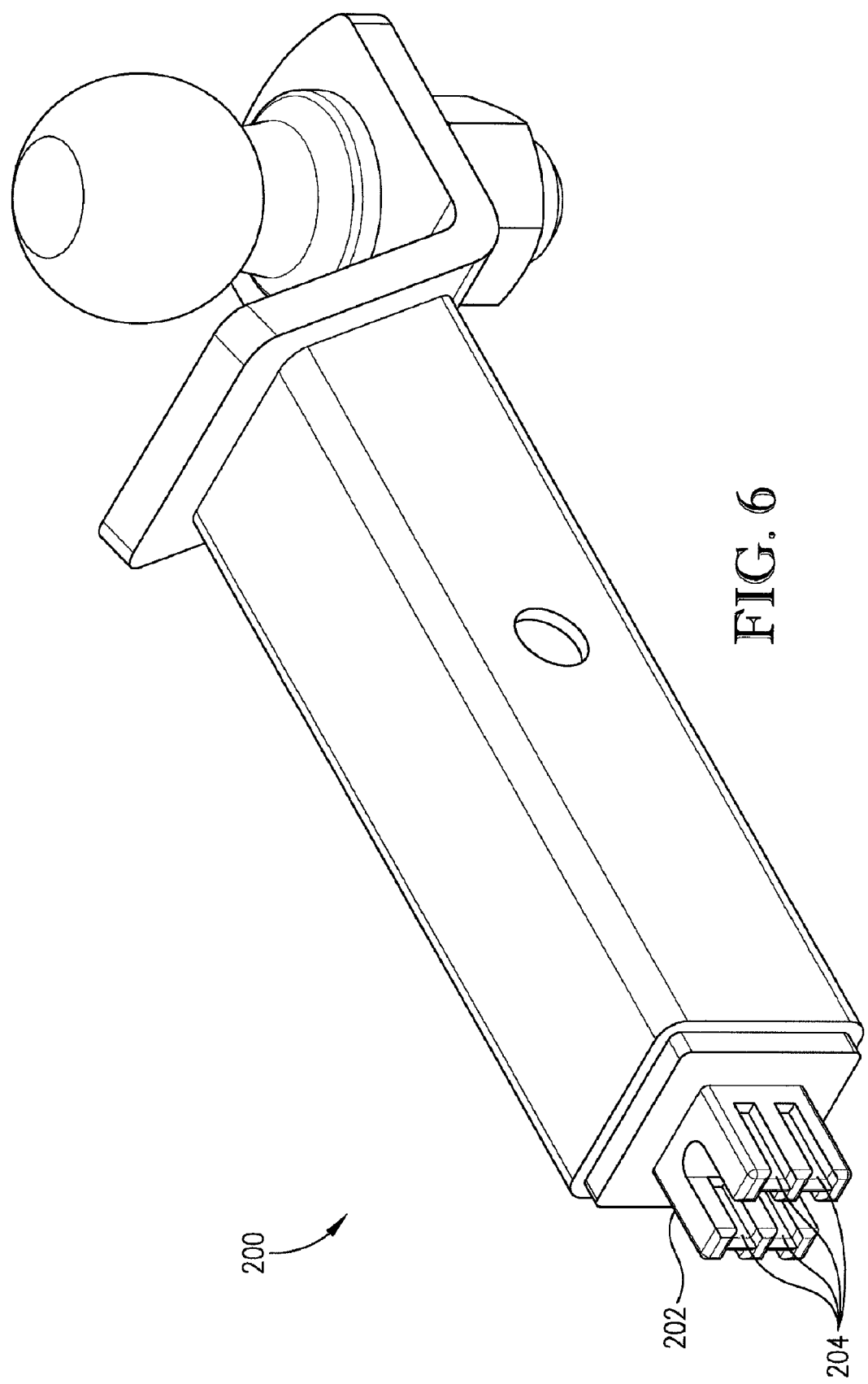
FIG. 6 is a perspective view of a trailer hitch apparatus constructed in accordance with an embodiment of the present invention.

Turning now to FIG. 6, a trailer hitch apparatus 200 constructed in accordance with another embodiment of the invention is shown. The trailer hitch apparatus 200 is substantially similar to the trailer hitch apparatus 10 of FIGS. 1-4 and therefore only the differences between the embodiments will be indicated. In this embodiment, the third electrical connector 202 comprises a plurality of electrical contacts 204. The second electrical connector of the receiver tube (not shown) is a corresponding shape operable to matingly connect with the third electrical connector 202.

Figure 7:
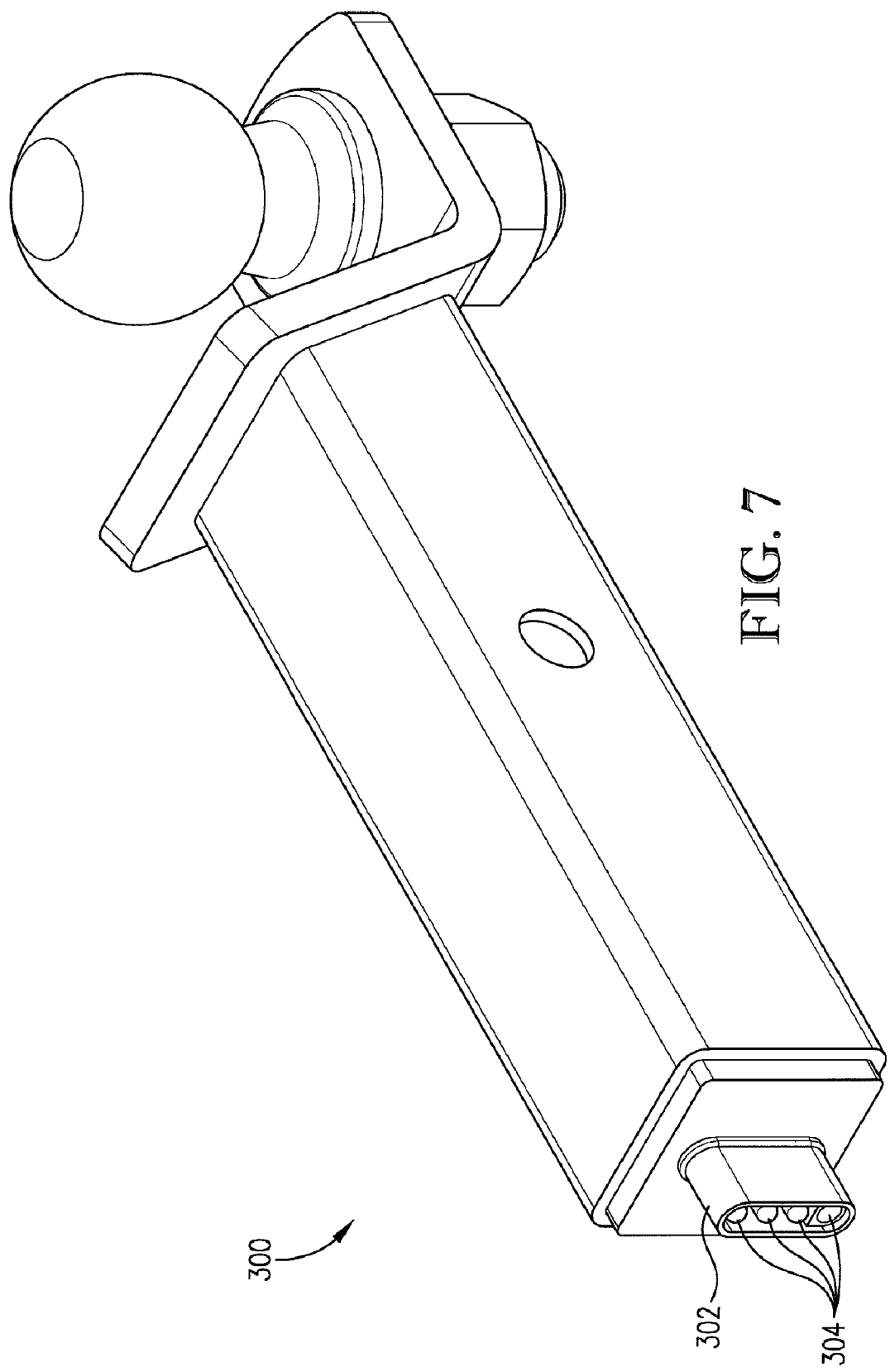
FIG. 7 is a perspective view of a trailer hitch apparatus constructed in accordance with an embodiment of the present invention.

Turning now to FIG. 7, a trailer hitch apparatus 300 constructed in accordance with another embodiment of the invention is shown. The trailer hitch apparatus 300 is substantially similar to the trailer hitch apparatus 10 of FIGS. 1-4 and therefore only the differences between the embodiments will be indicated. In this embodiment, the third electrical connector 302 is an four-flat connector with a plurality of contacts 304. The second electrical connector of the receiver tube (not shown) is a corresponding four-flat connector operable to matingly connect with the third electrical connector 302.

Turning now to FIGS. 8 and 9, a trailer hitch apparatus 400 constructed in accordance with another embodiment of the invention is shown. The trailer hitch apparatus 400 is substantially similar to the trailer hitch apparatus 10 of FIGS. 1-4 and therefore only the differences between the embodiments will be indicated. In this embodiment, the electrical receptacle 402 is attached to a receptacle housing 404 that is attached to the mounting tube 406. The receptacle housing 404 of this embodiment comprises two trapezoidal side portions, a square back portion, a square top portion and a square front portion having a hole for supporting the electrical receptacle 402. The receptacle housing 404 may also include flanges to allow attachment to the mounting tube 406 or attachment mount 408. The electrical housing may be made of metal, plastic, rubber or any other material and may be secured to the mounting tube 406 or attachment mount 408 with screws, adhesives, welds, rivets, or the like.

The electrical receptacle 402 also includes a spring-biased lid 410 that closes automatically when not being held in an open position and prevents water from contacting the electrical receptacle 402 when closed. Conductor 412 connects the electrical receptacle 402 to the third electrical connector 414 by passing through a hole 416 in the mounting tube 406. The hole 416 may additionally be covered by a grommet to protect the conductor 408.

Turning to FIGS. 10 and 11, a trailer hitch apparatus 500 constructed in accordance with another embodiment of the invention is shown. The trailer hitch apparatus 500 is substantially similar to the trailer hitch apparatus 400 of FIGS. 8 and 9 and therefore only the differences between the embodiments will be indicated. In this embodiment, the electrical receptacle 502 is a four-flat connector attached to a receptacle housing 504 that is attached to the mounting tube 506. Conductor 510 connects the electrical receptacle 502 to the third electrical connector 512 by passing through a hole 514 in the mounting tube 506. In this embodiment, there is no lid covering the electrical receptacle 502, but a lid may be added without deviating from the scope of the invention.

Turning to FIGS. 12 and 13, a trailer hitch apparatus 600 constructed in accordance with another embodiment of the invention is shown. The trailer hitch apparatus 600 is substantially similar to the trailer hitch apparatus 10 of FIGS. 1-4 and therefore only the differences between the embodiments will be indicated. In this embodiment, the electrical receptacle 602 is a four-flat connector mounted through a hole in a lateral side of the mounting tube 604. The electrical receptacle 602 additionally comprises a grommet portion 606 to help secure the electrical receptacle 602 within a hole in the mounting tube 604 and to prevent water entry.

Turning to FIGS. 14 and 15, a trailer hitch apparatus 700 constructed in accordance with another embodiment of the invention is shown. The trailer hitch apparatus 700 is substantially similar to the trailer hitch apparatus 10 of FIGS. 1-4 and therefore only the differences between the embodiments will be indicated. In this embodiment, the electrical receptacle 702 is a four-flat connector and additionally comprises a grommet portion 704 for securing the electrical receptacle 702 within a hole in an electrical receptacle bracket 706.

The electrical receptacle bracket 706 is U-shaped having a planar bottom portion and substantially planar sidewalls for attaching to the lateral side of the mounting tube 708 with a hole in the planar bottom portion for allowing the electrical receptacle 702 to mount therein. The electrical receptacle bracket 706 may be made of steel, aluminum, plastic or any other material and may be attached to the mounting tube 708 with screws, bolts, adhesives, welds, or the like. The conductor 710 is connected to the electrical receptacle 702, passes through a hole 712 in the lateral side of the mounting tube 708. The hole may include a grommet to prevent chaffing of the outer insulating layer of the conductor 710.

The third electrical connector 714 of this embodiment is attached to an inside wall of the mounting tube 708 and the second electrical connector 716 is correspondingly attached to an inside wall of the receiver tube 718 so that, when installed, the second electrical connector 716 is operable to matingly connect with the third electrical connector 714.

Turning to FIGS. 16 and 17, a trailer hitch apparatus 800 constructed in accordance with another embodiment of the invention is shown. The trailer hitch apparatus 800 is substantially similar to the trailer hitch apparatus 10 of FIGS. 1-4 and therefore only the differences between the embodiments will be indicated. In this embodiment, the electrical receptacle 802 is generally L-shaped and comprises a grommet portion 806, a securing portion 808, and a plurality of electrical contacts 810 in a five pole round configuration. The grommet portion 806 is within a hole 812 in the mounting tube 814 and the securing portion 808 is attached to the attachment mount 816 with a screw 818. Various other attachment devices may be used to attach the securing portion to the attachment mount including rivets, bolts, adhesives, welds, or the like, without deviating from the scope of the invention. The conductor 820 is routed through the grommet portion 806 of the electrical receptacle 802 inside the mounting tube 814 to the third electrical connector (not shown). In this embodiment, there is no lid covering the electrical receptacle 802, but a lid may be added without deviating from the scope of the invention.

Figures 18, 19:
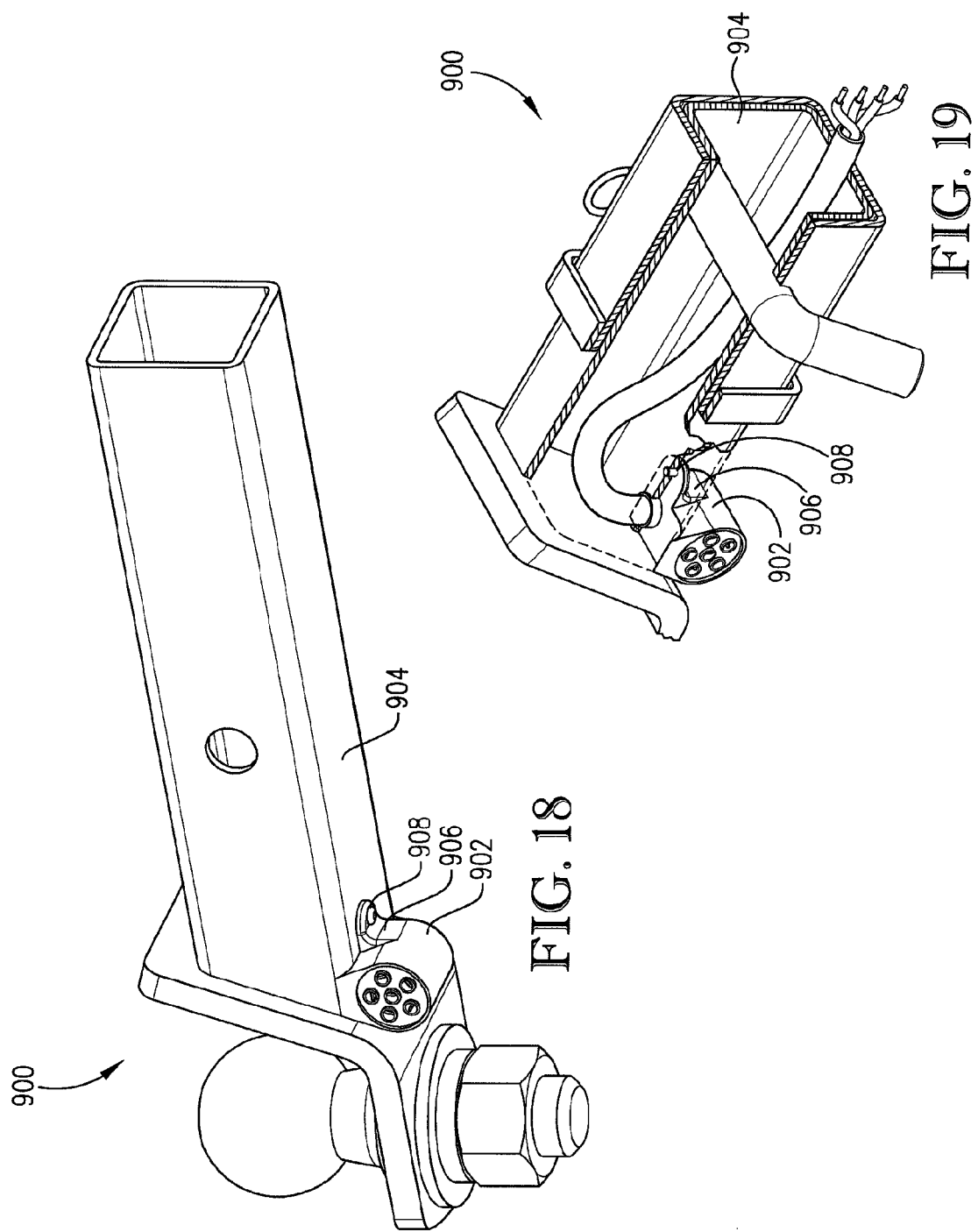
FIG. 18 is a perspective view of a trailer hitch apparatus constructed in accordance with an embodiment of the present invention.
FIG. 19 is a perspective view with cutaways to show internal components of a trailer hitch apparatus constructed in accordance with an embodiment of the present invention.

Turning to FIGS. 18 and 19, a trailer hitch apparatus 900 constructed in accordance with another embodiment of the invention is shown. The trailer hitch apparatus 900 is substantially similar to the trailer hitch apparatus 800 of FIGS. 16 and 17 and therefore only the differences between the embodiments will be indicated. In this embodiment, the electrical receptacle 902 is attached to the underside of the mounting tube 904 in a transverse orientation with the securing portion 906 fixed to the underside of the mounting tube 904 with a screw 908. Electrical receptacle 902 includes a plurality of electrical contacts 910 a lateral side. Additionally, the electrical receptacle 902 may include a first plurality of electrical contacts and a second plurality of electrical contacts on opposing sides. The first plurality of electrical contacts may be the same as, or different than, the second plurality of electrical contacts. For example, the first plurality of electrical contacts may be a six-pole round and the second plurality of electrical contacts may be a five-pole round.

Turning to FIGS. 20 and 21, a trailer hitch apparatus 1000 constructed in accordance with another embodiment of the invention is shown. The trailer hitch apparatus 1000 is substantially similar to the trailer hitch apparatus 10 of FIGS. 1-4 and therefore only the differences between the embodiments will be indicated. In this embodiment, the electrical receptacle 1002 comprises a plurality of electrical contacts 1006, a circumferential flange portion 1008 and two securing portions 1010. The electrical receptacle 1002 is secured partially inside a hole in the side of the mounting tube 1012 with two screws 1014 through the two securing portions 1010 and engaging the mounting tube 1012 so that the circumferential flange portion 1008 is flush with the outer face of the mounting tube 1012. In this embodiment, there is no lid covering the electrical receptacle 1002, but a lid may be added without deviating from the scope of the invention.

Turning to FIGS. 22 and 23, a trailer hitch apparatus 1100 constructed in accordance with another embodiment of the invention is shown. The trailer hitch apparatus 1100 is substantially similar to the trailer hitch apparatus 900 of FIGS. 18 and 19 and therefore only the differences between the embodiments will be indicated. In this embodiment, the electrical receptacle 1102 is a four flat with a grommet portion 1104 depending from a side of the electrical receptacle 1102 and securing the electrical receptacle within a hole in the attachment mount 1106 in a orientation generally flat with the face of the attachment mount 1106 and transverse to the primary axis of the mounting tube 1108. The electrical receptacle 1102 may be additionally be secured to the attachment mount 1106 with screws, adhesives, welds or the like without deviating from the scope of the invention.

Figure 24:
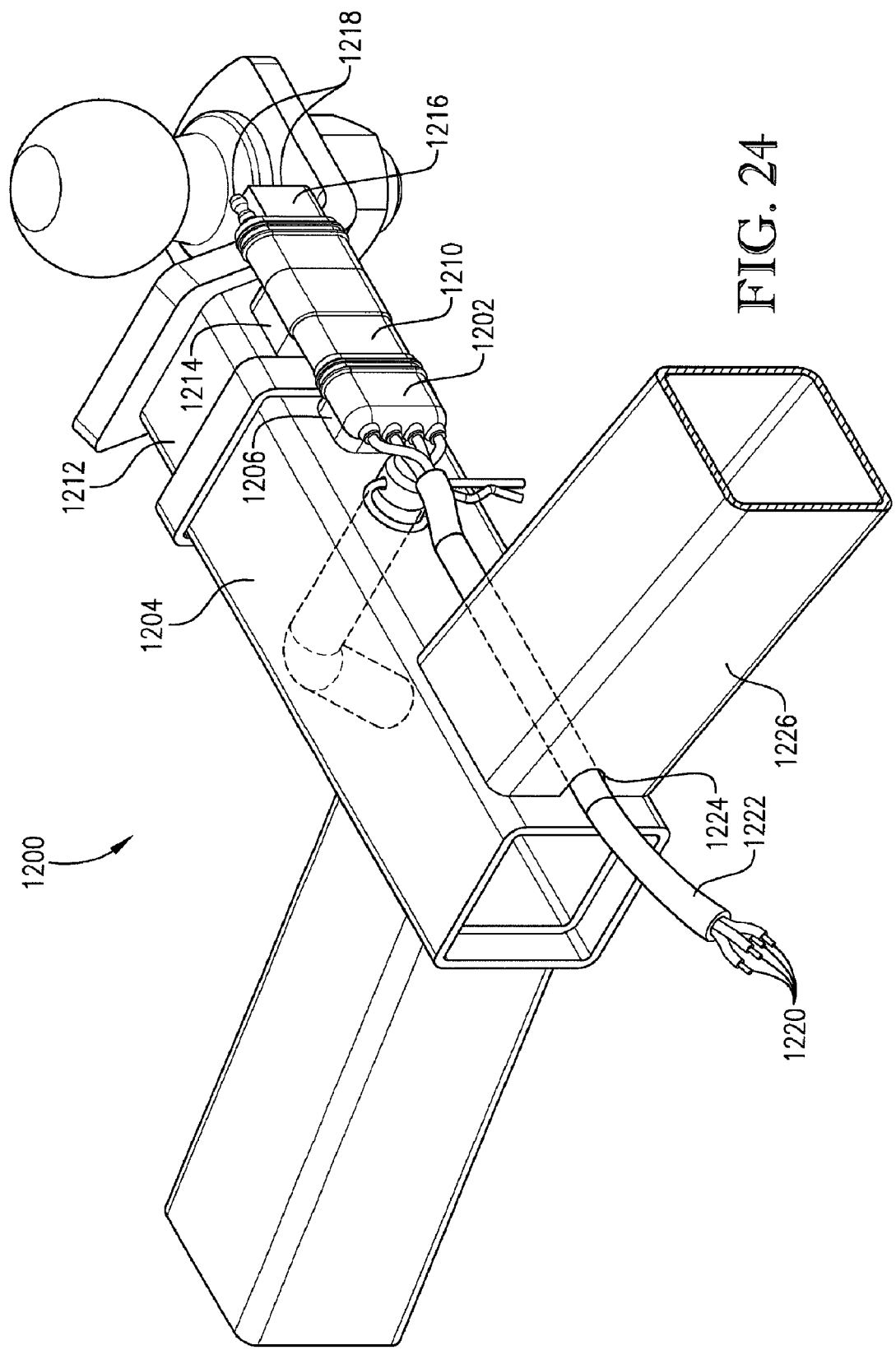
FIG. 24 is a perspective view of a trailer hitch apparatus constructed in accordance with an embodiment of the present invention.
Figure 25:
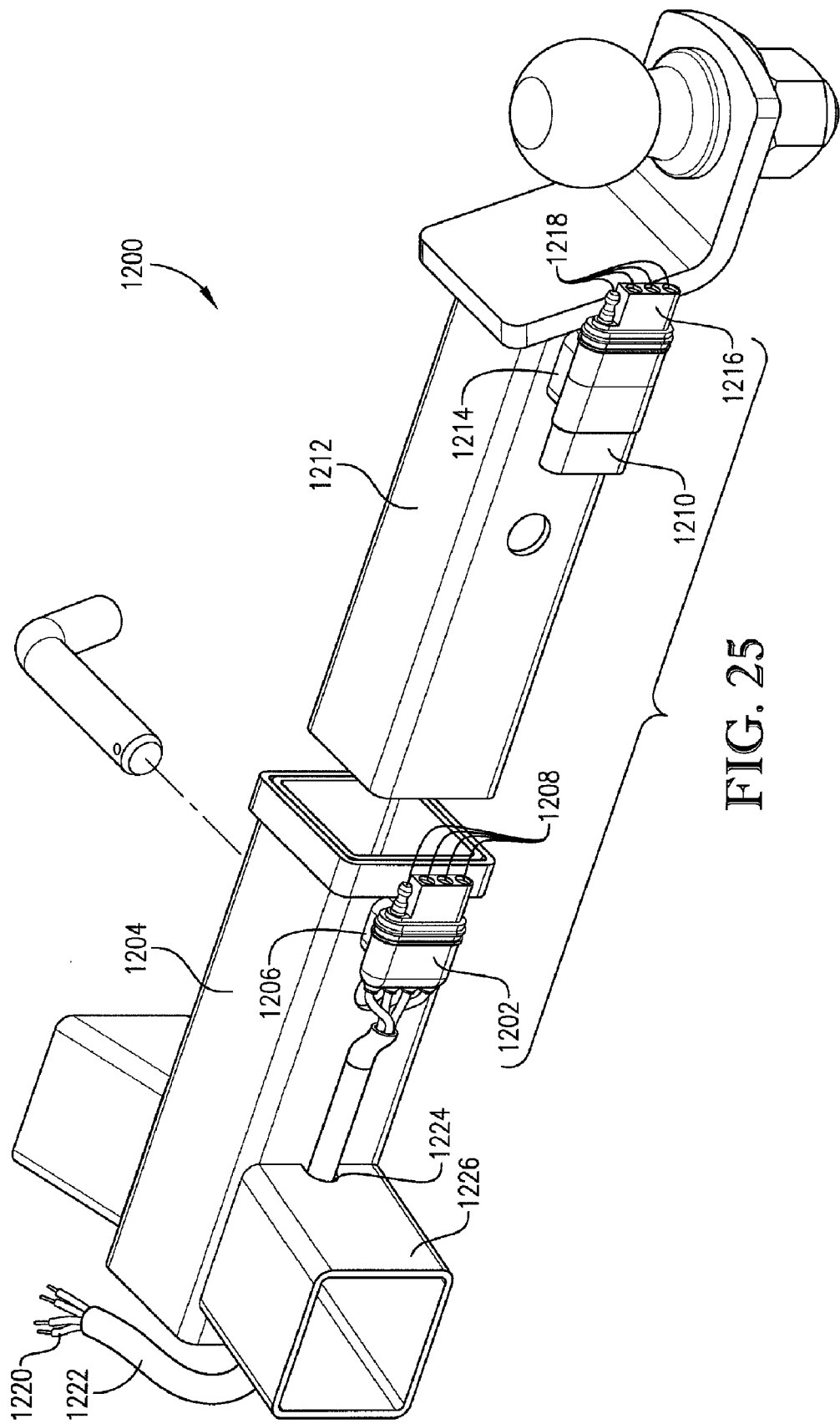
FIG. 25 is a perspective view of a disassembled trailer hitch apparatus constructed in accordance with an embodiment of the present invention.
Figure 26:
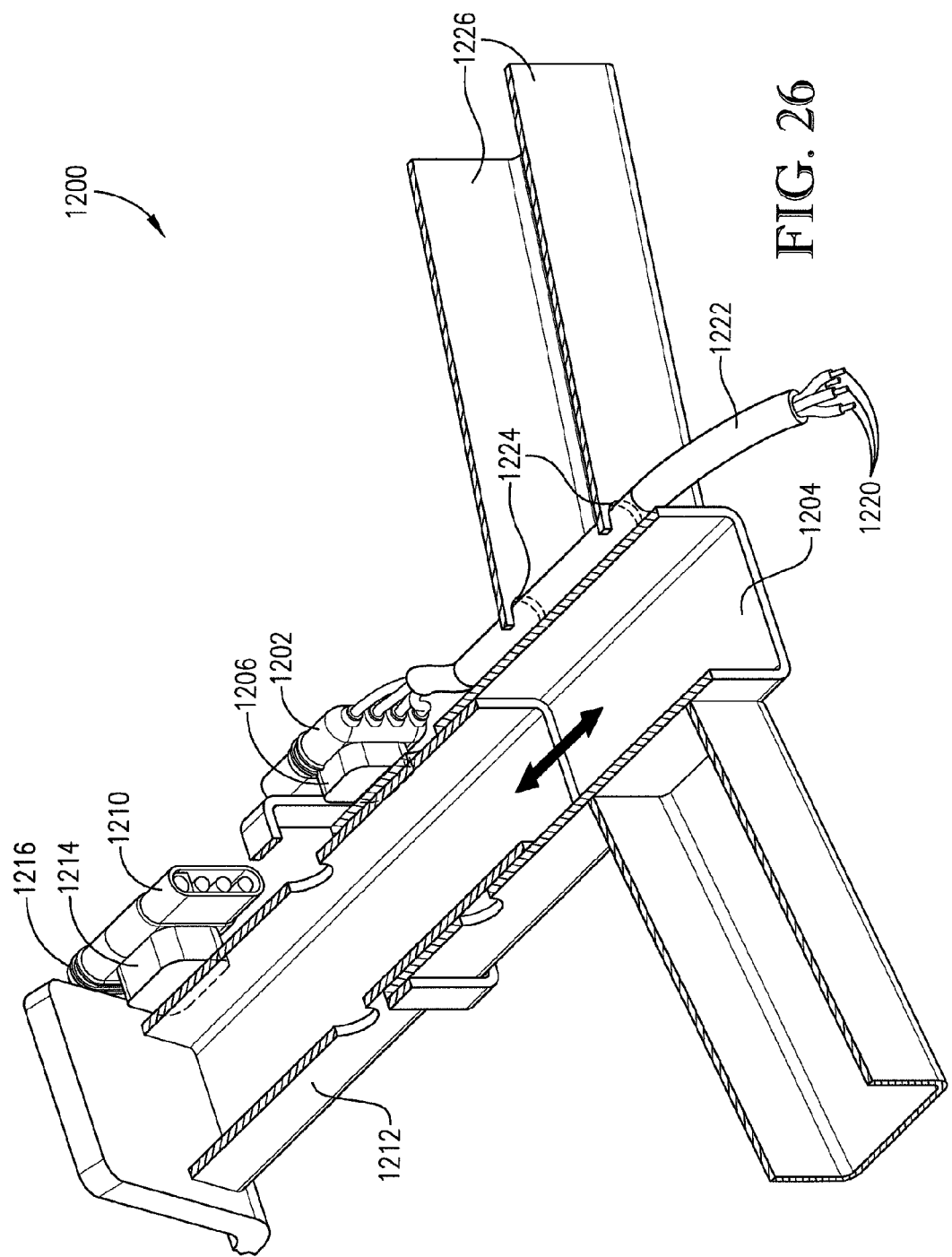
FIG. 26 is a perspective view with cutaways to show internal components of a trailer hitch apparatus constructed in accordance with an embodiment of the present invention.

Turning to FIGS. 24-26, a trailer hitch apparatus 1200 constructed in accordance with another embodiment of the invention is shown. The trailer hitch apparatus 1200 is substantially similar to the trailer hitch apparatus 10 of FIGS. 1-4 and therefore only the differences between the embodiments will be indicated. In this embodiment, the second electrical connector 1202 is a four flat attached to the side of the receiver tube 1204 with a first mount 1206 so that the electrical contacts 1208 are parallel with the receiver tube 1204. The third electrical connector 1210 is a four flat attached to the side of the mounting tube 1212 with a second mount 1214 and axially aligned with the second electrical connector 1202 so that when the mounting tube 1212 is inserted into the receiver tube 1204, the second electrical connector 1202 matingly connects with the third electrical connector 1210. The third electrical connector 1210 may be the same as, or different from, the second electrical connector 1202. For example, the second electrical connector 1202 may be a six pin flat and the third electrical connector 1210 may be a four flat. The electrical receptacle 1216 is a four flat and attached to the third electrical connector 1210 with electrical contacts 1218 on the opposite end as the third electrical connector 1210. The first electrical connector 1220 is connected to a plurality of conductors 1222 and routed through holes 1224 in the frame 1226. The plurality of conductors 1222 may also be routed around the frame without deviating from the scope of the invention.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

1. A trailer hitch apparatus for mechanically and electrically coupling a towed vehicle having an electrical system to a towing vehicle having an electrical system, the trailer hitch apparatus comprising:

a receiver comprising:
  a receiver tube having an open end and a pin hole;
  a first electrical connector for attaching to the electrical system of the towing vehicle; and
  a second electrical connector electrically connected to the first electrical connector;
a trailer mount installed within the open end of the receiver tube, the trailer mount comprising:
  a mounting tube comprising a first end for inserting into the receiver tube, a second end, and a pin hole;
  a third electrical connector operable to mate with the second electrical connector;
  an attachment mount connected to the second end of the mounting tube, the attachment mount comprising:
    a horizontal portion having a hole for attaching a trailer attachment device; and
    a slanted portion having a hole for mounting an electrical receptacle;
  a trailer attachment device connected to the attachment mount for attaching a towed vehicle; and
  said electrical receptacle electrically connected to the third electrical connector and mounted within the hole in the slanted portion of the attachment mount for providing an electrical signal to the electrical system of the towed vehicle; and
a pin placed within the pin hole of the receiver tube and the pin hold of the mounting tube for securing the mounting tube thing the receiver tube.

2. The trailer hitch apparatus of claim 1, wherein the trailer attachment device is chosen from the group consisting of a ball mount, a multiple ball mount, a pintle hook, a tow ring, a tow strap mount, a clevis mount, and a combination thereof.

3. The trailer hitch apparatus of claim 1, further comprising a lid operable to cover the electrical receptacle.

4. The trailer hitch apparatus of claim 1, wherein the electrical receptacle is chosen from the group consisting of a four wire flat, a five wire flat, a four pole round, a five pole round, a six pole round, a seven pole RV blade and a six pole square.

5. The trailer hitch apparatus of claim 1, wherein:
the receiver tube has an inner width and an inner height and the inner width and inner height is 5.08 cm (2 inches) or 3.175 cm (1.25 inches); and
the mounting tube has an exterior width and exterior height and the exterior width and exterior height is less than the interior width and height of the receiver tube.

6. The trailer hitch apparatus of claim 1, wherein the electrical receptacle further comprises:
a securing portion with a hole therein for providing a location to secure the electrical receptacle to a surface; and
a screw for insertion in the hole in the attachment mount for securing the electrical receptacle to the surface.

7. The trailer hitch apparatus of claim 1, wherein the electrical receptacle further comprises a circumferential flange.

8. The trailer hitch apparatus of claim 1, wherein the electrical receptacle further comprises a grommet portion for securing the electrical receptacle within a hole.

9. A trailer hitch apparatus for mechanically and electrically coupling a towed vehicle having an electrical system to a towing vehicle having an electrical system, the trailer hitch apparatus comprising:
a receiver comprising:
  a receiver tube having an first open end, a second end and a pin hole;
  a first electrical connector for attaching to the electrical system of the towing vehicle;

a second electrical connector attached to the second end of the receiver tube and electrically connected to the first electrical connector; and a frame for providing an attachment point to the towing vehicle;

a trailer mount installed within the open end of the receiver tube, the trailer mount comprising:

a mounting tube comprising a first end for inserting into the receiver tube, a second end, and a pin hole;

a third electrical connector attached to the first end of the mounting tube operable to mate with the second electrical connector;

an attachment mount connected to the second end of the mounting tube, the attachment mount comprising:

a horizontal portion having a hole for attaching a trailer attachment device; and a slanted portion having a hole for mounting an electrical receptacle;

a trailer attachment device connected to the attachment mount for attaching a towed vehicle wherein the trailer attachment device is a ball mount;

said electrical receptacle electrically connected to the third electrical connector and mounted within the hole in the slanted portion of the attachment mount for providing an electrical signal to the electrical system of the towed vehicle; and a pin placed within the pin hole of the receiver tube and the pin hold of the mounting tube for securing the mounting tube thing the receiver tube.

10. The trailer hitch apparatus of claim 9, wherein the electrical receptacle is chosen from the group consisting of a four wire flat, a five wire flat, a four pole round, a five pole round, a six pole round, a seven pole RV blade and a six pole square.

11. The trailer hitch apparatus of claim 9, wherein:

the receiver tube has an inner width and an inner height and the inner width and inner height is 5.08 cm (2 inches) or 3.175 cm (1.25 inches); and the mounting tube has an exterior width and exterior height and the exterior width and exterior height is less than the interior width and height of the receiver tube.

12. The trailer hitch apparatus of claim 9, further comprising a lid operable to cover the electrical receptacle.

* * * * *